UNITED STATES PATENT OFFICE.

JAMES S. SCHRACK, OF JESUP, IOWA.

LINIMENT.

SPECIFICATION forming part of Letters Patent No. 407,551, dated July 23, 1889.

Application filed March 26, 1889. Serial No. 304,821. (No specimens.)

*To all whom it may concern:*

Be it known that I, JAMES S. SCHRACK, of Jesup, in the county of Buchanan and State of Iowa, have invented a new and useful Liniment, to be used in the treatment of flesh wounds—such as cuts from barbed-wire fences, &c.—of which the following is a specification.

The composition consists of the following ingredients, combined in the proportions stated, viz: Spirits of turpentine, sixteen ounces; olive-oil, eight pints; sulphuric acid, six ounces; carbolic acid, one dram; strained honey, one ounce; oil of-amber, one ounce.

In mixing the ingredients the sulphuric acid is slowly added to the olive-oil, and when this has cooled the other ingredients are added and the whole agitated to thoroughly mix them.

In using the above-described composition the wound is first cleaned and then the composition is applied directly to the wound.

By the use of the above composition the wound will soon heal and the pain be lessened.

Having thus fully described my invention, I claim as new and desire to secure by Letters Patent—

The herein-described composition of matter, to be used for curing and healing flesh wounds, consisting of spirits of turpentine, olive-oil, sulphuric acid, carbolic acid, strained honey, and oil of amber, in the proportions specified.

JAMES X S. SCHRACK.
his mark

Witnesses:
J. A. LAIRD,
T. F. KENYON.